UNITED STATES PATENT OFFICE 2,666,032

CONTROLLING VISCOSITY OF DRILLING FLUIDS

Walter J. Weiss, Rolling Hills Area, Calif., assignor to The Texas Company, New York, N. Y., a corporation of Delaware No Drawing. Application April 11, 1952, Serial No. 281,919

10 Claims. (Cl. 252—8.5)

The present invention relates to the drilling of wells through subsurface formations by means of well drilling tools and more particularly to rotary drilling operations involving the circulation of a water base drilling fluid or mud, containing colloidal particles of clayey material through the bore hole and about the drilling bit.

The present invention particularly contemplates controlling the viscosity of high alkalinity, limed, drilling muds to render the same readily circulatable, and, in particular, overcoming undesired increase in viscosity such as frequently tends to occur in the case of drilling fluids containing the dispersible clay solids.

To this end the calcium clay mud is treated with caustic soda and a viscosity-reducing material formed by the hot alkali degradation of pectin under the influence of an elevated temperature over a time period sufficient to yield a calcium insensitive product, soluble in water, and which forms a substantially non-viscous aqeous solution and is free from gel-forming tendency. By calcium sensitivity, as used herein, is meant the tendency for the product to be precipitated at least in part from alkali solution by the presence of calcium ions. The present products, therefore, are compounds which form soluble calcium salts and therefore do not precipitate in the presence of calcium or like metal salts.

The high alkalinity, limed muds referred to are those formed by treating the mud with an alkaline earth metal compound to convert the clay present in the mud from the usual sodium form into an alkaline earth metal clay such as a calcium clay by base exchange. The term "high alkalinity" as used herein means a pH value above 11 and preferably above 11.5, advantageously in the range of 11–13. Regulation of the pH is effected by addition of alkali metal hydroxide either before or after addition of the viscosity reducing material and is desirable to prevent an unduly high viscosity of the mixture upon addition of the alkaline earth metal compound. The alkaline earth metal compound such as lime may be thereafter added to the mixture to effect conversion of the clay to the calcium form.

An excess of lime over that required to convert the clay to the calcium form is advantageous from the standpoint of inhibiting so-called "mud-making" or dispersion of the drilled material in the mud when drilling through highly hydratable clays or shales.

The viscosity reducing material, as above indicated, is prepared by the continuing and progressive hot alkali degradation of pectin to form a water soluble degration product which is soluble in water and forms water soluble calcium salts, and which is free from gel-forming tendencies and does not substantially affect the viscosity of its aqueous solutions.

In general the factors affecting the extent of degradation are the concentration of the hot alkali, the temperature of the treatment and the time period over which the treatment is effected. Degradation of the pectin proceeds in aqueous alkali solutions of any substantial alkali concentration, as for example about 1%, and at elevated temperatures about the boiling temperature. However, the rate of degradation varies with both the alkali concentration and the temperature. Therefore, the time required to realize the required extent of degradation is widely variant depending upon the other factors, and is best determined by continuing the degradative process until a product of the foregoing properties is realized.

The foregoing viscosity reducing agent exerts a profound viscosity reducing effect upon the undesirable, viscous, highly alkaline, limed muds described above. Small proportions, therefore, are effective to cause a marked decrease in viscosity. The typical, preferred drilling mud composition resulting from the practice of the present invention, therefore, comprises an aqueous mixture comprising calcium bentonite clay, the above viscosity reducing material, and lime, preferably in excess, with a pH value of about 11–13 and preferably above 11.5 resulting from the addition of caustic alkali. As above indicated, other alkaline earth metal hydroxides may be employed in place of the lime.

The method is applicable to the reconditioning of a drilling mud which has become contaminated with salt or cement or with other compounds encountered in drilling which have an adverse effect on the usual sodium bentonite mud. It is also useful in the preparation of suitabel drilling fluids when only salt water is available.

As previously intimated, the present invention is particularly advantageous in drilling readily dispersible shales, clays and the like which have a tendency to rapid and excessive dispersion in drilling fluid. For example, marine shales, which may be defined as shales deposited from fresh water suspensions by contact with salt water, tend to undergo spontaneous disintegration and suspensions in ordinary drilling fluid. This is spoken of as "making mud," and usually attended by a rapid increase in viscosity and gel strength due to the increasing in solids content of the mud.

The earlier, alkaline, lime base muds developed to combat this condition are prepared by suspending natural shales or clays in water, the alkalinity of which has been raised to a pH above 9.0 and preferably 11.5–12.0 or above by the addition of sodium hydroxide. To this mixture there is then added an alkaline earth metal salt or hydroxide, as for example, calcium hydroxide, i. e. slaked lime together with varying quantities of a stabilizing, protective colloid such as quebracho.

One theory underlying the use of these so-called lime base muds, is that the highly dispersible shales containing, as they do, calcium, sodium and potassium ions, are converted predominantly to calcium saturated shales through base exchange with the aqueous phase of the lime base drilling mud. Inasmuch as the calcium saturated clay is less susceptible to colloidal disintegration, it is therefore stabilized by the use of such drilling fluids.

The alkaline earth metal additives and/or the condition of relatively high alkalinity prevailing in the mud, however, has a profound effect upon the mud clay solids, resulting in an undesired increase in viscosity and necessitating the addition of varying quantities of a stabilizing material such as the quebracho referred to above.

In accordance with the present invention, the tendency toward objectionable viscosity of the alkaline, lime base muds is overcome at high pH ranges above about 11.0 by small quantities of the foregoing calcium insensitive, non-gelling derivatives of pectin. Surprisingly, these products remain soluble in the mud in the presence of multivalent ions encountered during drilling, and instead of undesirably contributing to viscosity, effect a profound decrease thereof.

For example, a series of typical tests were run in connection with a Kern #35 hole mud. In each test the mud was made up with the following relative amounts of lime and sodium hydroxide:

Lbs. per A. P. I. bbl.
Lime _____ 7
Sodium hydroxide _____ 1.75

A portion of this mud was mixed with 1.75 pounds per barrel of a calcium insensitive, non-gelling, hot, alkali degradation product of pectin comprising an arabino-galacturonic acid salt, and tests were made upon the several samples to determine the viscosity. The pectin degradation product imparted no substantial viscosity to water at a 4% solution concentration and did not precipitate upon acidification of the solution with hydrochloric acid to a pH of 1.4.

The following table lists the samples and the resulting stormer viscosity thereof together with the extent of viscosity reduction:

|  | Viscosity at 600 R. P. M. | Viscosity Reduction, Percent |
|---|---|---|
| Mud without Dispersant | 98 | 0 |
| Mud with Dispersant | 26.6 | 73 |

As an example of the preparation of a pectin degradation product, the following is presented.

A first solution was prepared containing 10 gms. of pectin dissolved in about 300 cc. of distilled water. A second solution was prepared containing 10 gms. of caustic soda in about 75 cc. of distilled water. The two solutions were heated to boiling and the second solution poured into the first. Heating was continued at the boiling point for an extended period of time during which water was evaporated and the solution finally concentrated to a volume of about 75 cc. The product was substantially calcium insensitive and free from gel-forming tendencies and possessed no substantial viscosity over that of distilled water. An additional product prepared as above was subject to further hot alkali degradation in the following manner. The product prepared as above was made up to 100 ml. volume with the addition of distilled water and thereafter boiled for approximately thirty minutes, during which the solution was agitated and aerated with carbon dioxide free air. The properties of the additionally degraded product as regards calcium insensitivity, absence of gel-forming tendencies and freedom from viscosity imparting tendency to water solutions were substantially the same as those of the first degradation product.

In order to test the efficacy of the foregoing products in reducing the velocity of high alkalinity limed muds, a Kern #35 hole mud was made up with lime and caustic as follows:

Lbs. per A. P. I. bbl.
Lime _____ 7
Caustic _____ 1.75

To separate samples of this high alkali lime mud, were added the respective foregoing degradation products in the amount equal to about 1.75 pounds per A. P. I. barrel of mud. The following table lists the several samples, the resulting stormer viscosity thereof, and the percentage extent of viscosity reduction:

|  | Viscosity at 600 R.P.M., cpe. | Viscosity Reduction, Percent |
|---|---|---|
| Mud without dispersant | 89.2 | 0 |
| Mud with first prepared degradation product | 14.5 | 84 |
| Mud with additionally degraded product | 11.5 | 87 |

In contrast, when ordinary pectin products were substituted for the degraded materials, the viscosity of the mud amounted to about 182 cpe. and the calcium sensitivity was very high.

It is to be borne in mind that pectin and its ordinary depolymerized or partially degraded products typically tend to increase the viscosity of aqueous fluids. For instance, it has been proposed in U. S. Patent 2,319,705 to restrict the loss of drilling fluid into porous subsurface formations by including pectate and degraded pectin products in the mud. The layer of filter cake formed by such a mud upon the walls of the bore hole accordingly contains a gel-like pectin which occupies the interstices of the filter cake and therefore decreases its permeability to water. As also disclosed in this patent, the pectin products may be employed to subsantially increase the viscosity of the fluid without the benefit of any clay content whatsoever. Therefore, the viscosity of such fluids tends to become excessive, particularly in the presence of salt, lime, anhydrite, or other materials encountered in drilling which inherently tend to increase the viscosity of a clay mud. As shown by the specific data of the patent, even the relatively low viscosity pectin products disclosed therein, in all cases, result in an undesirable increase in the viscosity of the drilling fluid.

The present invention, in direct contrast, provides a non-viscous additive free from any gelling or thickening effect and free of sensitivity toward alkali or alkaline earth metal salts or bases. For example, the addition of calcium chloride followed by sodium hydroxide to a water solution of the degradation product has no apparent effect, except precipitation of excess calcium as calcium hydroxide. No calcium gellation or precipitation of the additive is apparent. Moreover, high concentrations of sodium chloride have no apparent effect. Accordingly, therefore, the present invention distinguishes in that instead of employing a gel for restricting permeability to water it contemplates the addition of a non gel-forming material which materially and surprisingly decreases the actual viscosity of the drilling fluid.

The range of concentration in which the additive salt is effective is quite broad, extending from as low as about 0.1% up to as high as 5–10%. Ordinarily, a concentration of about 0.3–2.0% is maintained. An important advantage, from the standpoint of economical operation, resides in the relatively small quantity of additive which will effect a profound reduction in viscosity. Manifestly, the optimum addition depends primarily upon the extent of viscosity reduction required to maintain the fluid in satisfactory condition.

The mud formulation or mud reconstitution may be practiced by simply effecting a thorough intermixing of the additive with the mud and with the caustic alkali and lime, if necessary, in the mud pit or any convenient location in the system.

It is contemplated, of course, that the conversion of the clay from the usual sodium form into an alkaline earth metal clay be effected by mean of salts capable of forming a sufficiently soluble or ionizable solution to effect an exchange of the alkaline earth metal ion with the monovalent ion of the clay. For example, calcium salts which may be mentioned are calcium sulfate, calcium chloride and lime, but not insoluble salts such as calcium carbonate.

The present invention contemplates, of course, the inclusion in the drilling fluid composition of conventional drilling mud constituents in addition to the dispersible clay constituents previously mentioned. Such, for example, are the various so-called weighting agents, such as barytes, litharge, pyrites, etc., the colloidal constituents such as bentonite and other clays, the various modifiers such as boiled starch, soaps, etc., and the wall building and water loss materials conventionally employed to control the physical properties and particularly the thixotropic action of the mud. As above indicated, the present drilling fluids are of particular advantage from the standpoint of stability against contamination by subsurface calcium or salt deposits or solutions and other conditions normally adverse to the physical drilling mud properties.

Obviously many modifications and variations of the invention, as herein set forth, may be made without departing from the spirit and scope thereof, and therefore only such limitations should be imposed as are indicated in the appended claims.

I claim:

1. An aqueous high alkalinity drilling mud comprising a hydratable alkaline earth metal clay dispersed in water and at least 0.1% of a viscosity reducing material comprising a derivative of pectin prepared by the action upon pectin of a hot alkali solution, said treatment being continued until the product reaches the condition of calcium insensitivity, said product imparting substantially no increase in viscosity to water solutions thereof, being non-gelling in water and being present in sufficient amount in the drilling mud to substantially decrease the viscosity thereof.

2. A drilling mud in accordance with claim 1 having a pH value of about 11–13.

3. A drilling mud in accordance with claim 1 containing an alkali metal base and having a pH of at least about 11.5.

4. A drilling mud in accordance with claim 1 wherein said derivative of pectin is prepared by treatment with a hot alkali solution containing at least about 10% caustic alkali and maintained at about the boiling point of the solution.

5. A drilling fluid in accordance with claim 1 containing said derivative of pectin in an amount equal to about 0.1–10% by weight.

6. A drilling mud in accordance with claim 1 containing free calcium hydroxide.

7. The method of treating an aqueous drilling mud containing an alkali metal clay dispersed in water which comprises regulating the pH value to about 11.0, mixing the mud with an alkaline earth metal compound in an amount at least sufficient to convert the alkali metal clay substantially to alkaline earth metal clay and adding at least 0.1% of a viscosity reducing material comprising a derivative of pectin prepared by the action upon pectin of a hot alkali solution, said treatment being continued until the product reaches the condition of calcium insensitivity, said product imparting substantially no increase in viscosity to water solutions thereof, being non-gelling in water and being present in sufficient amount in the drilling mud to substantially decrease the viscosity thereof.

8. The method according to claim 7 wherein the pH value is regulated to a value above about 11.5.

9. The method according to claim 7 wherein said alkaline earth metal compound is lime.

10. In the drilling of a well by the rotary method wherein a drilling mud comprising an alkaline earth metal clay dispersed in water is circulated through the bore hole during the drilling operation, the steps of treating the drilling mud to control its viscosity, which comprise mixing with the mud at least 0.1% of a viscosity reducing material comprising a derivative of pectin prepared by the action upon pectin of a hot alkali solution, said treatment being continued until the product reaches the condition of calcium insensitivity, said product imparting substantially no increase in viscosity to water solutions thereof, being non-gelling in water and being present in sufficient amount in the drilling mud to substantially decrease the viscosity thereof, and maintaining the pH value of the mud above 11.0 during the drilling operation.

WALTER J. WEISS.

(References on following page)